Jan. 30, 1940. A. E. ROSE 2,188,726
APPARATUS FOR MOLDING TILE
Filed Nov. 18, 1938 4 Sheets-Sheet 1
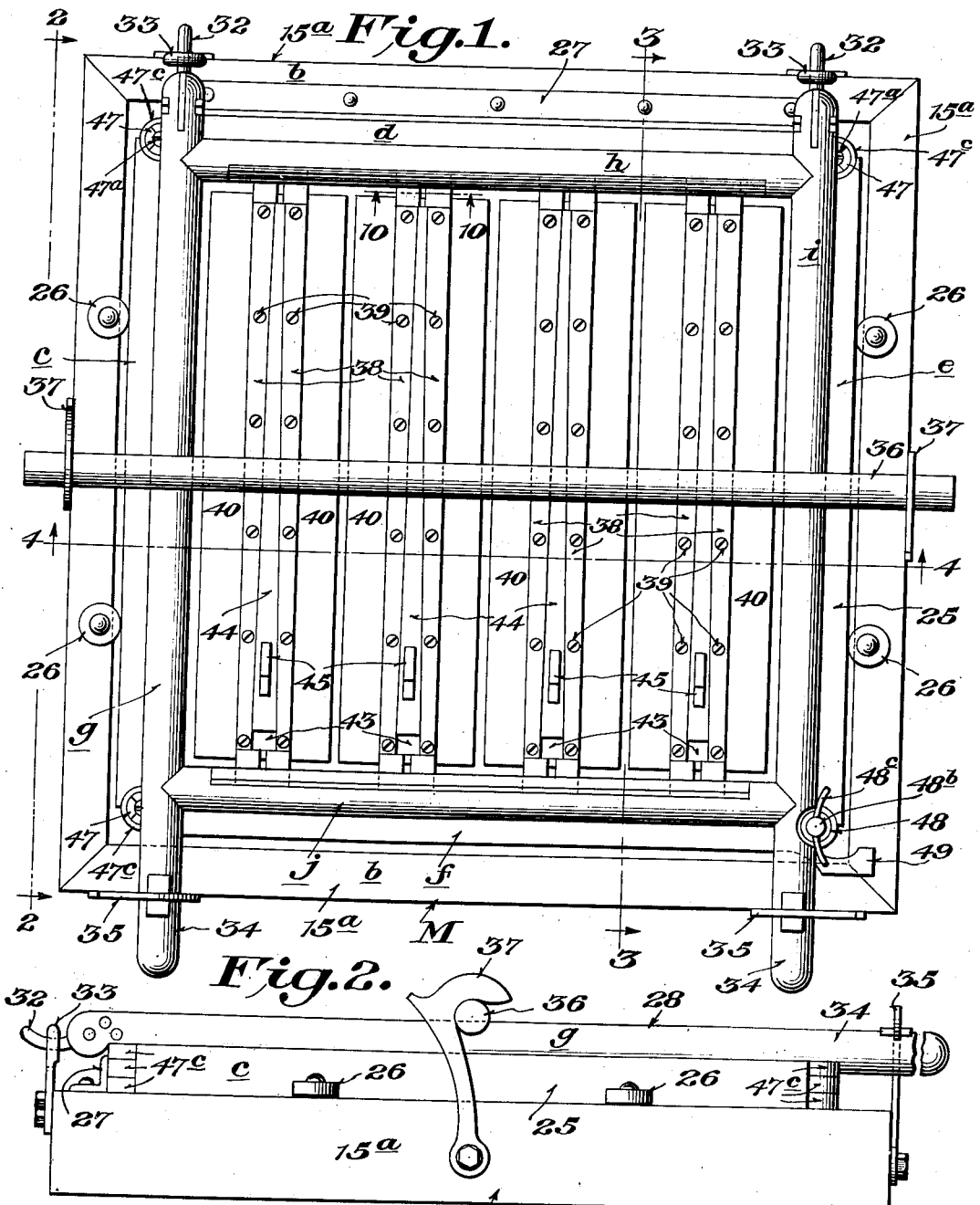
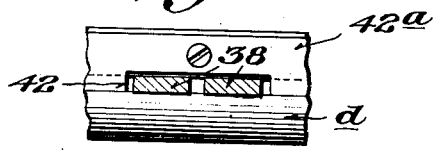

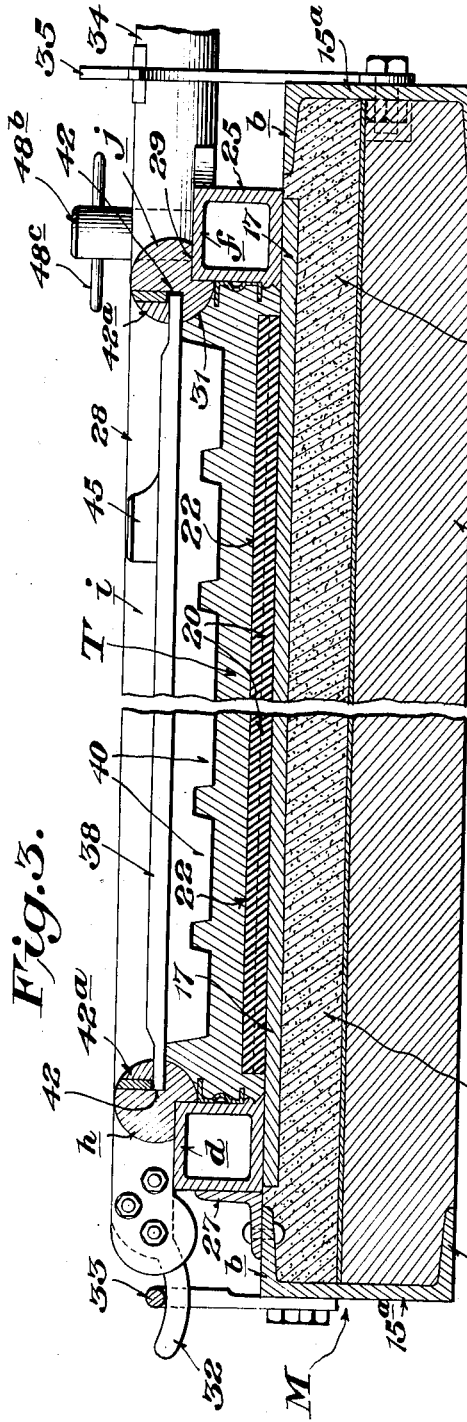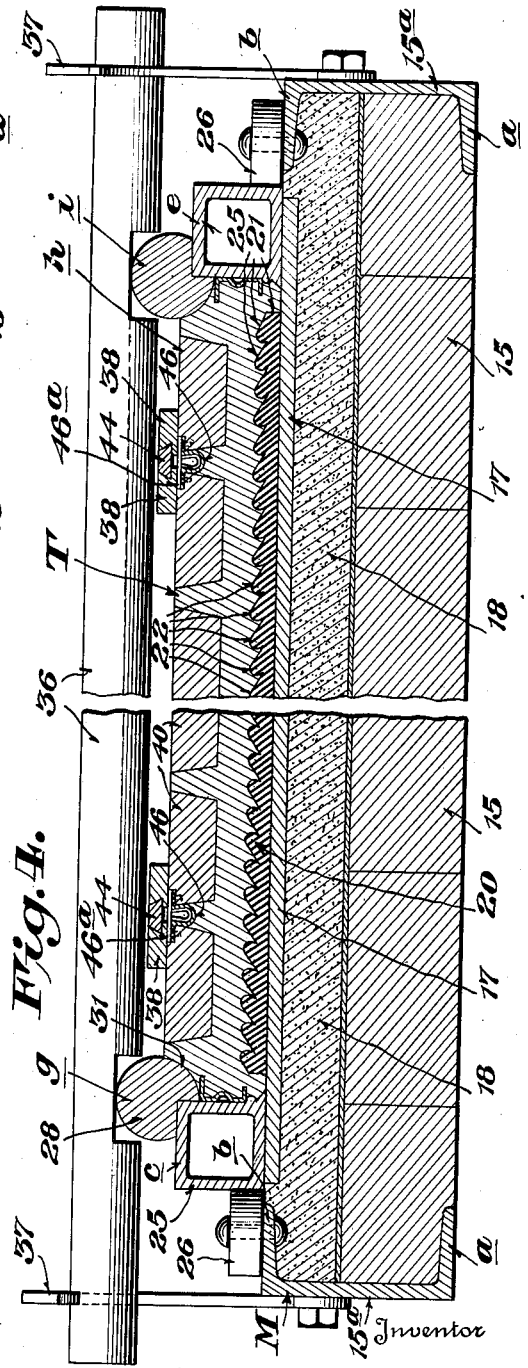

Jan. 30, 1940.     A. E. ROSE     2,188,726
APPARATUS FOR MOLDING TILE
Filed Nov. 18, 1938     4 Sheets-Sheet 3
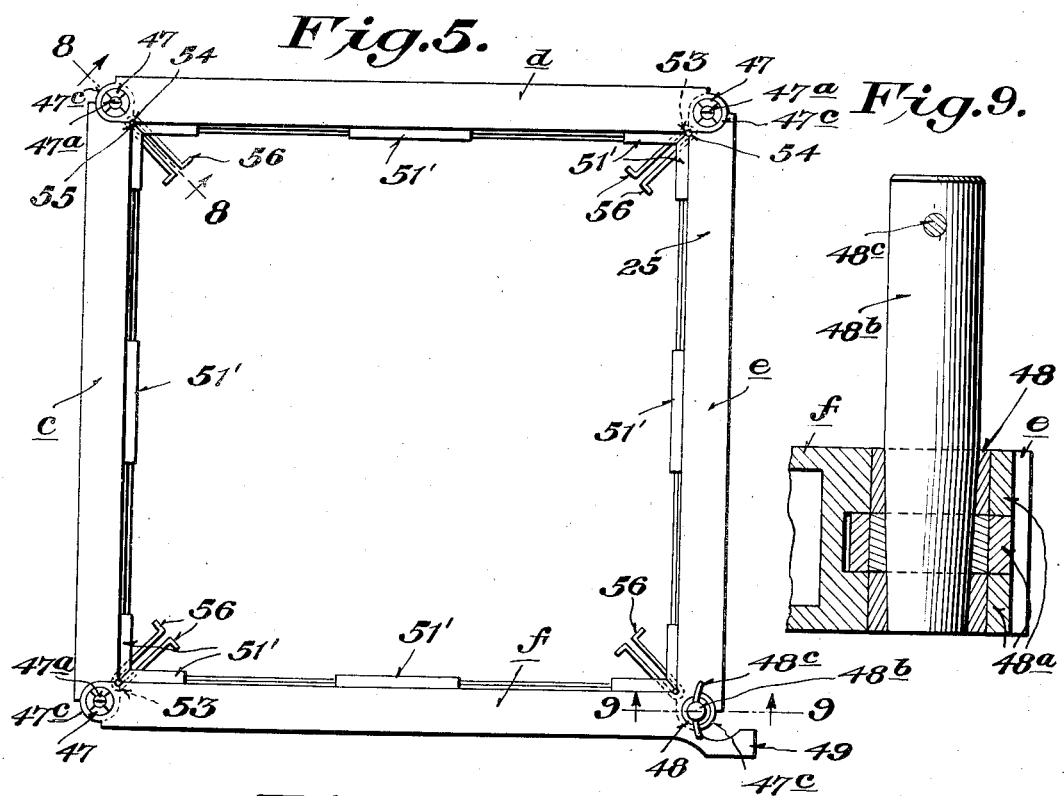
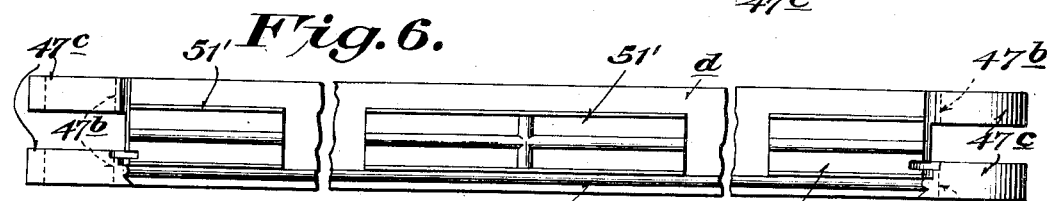
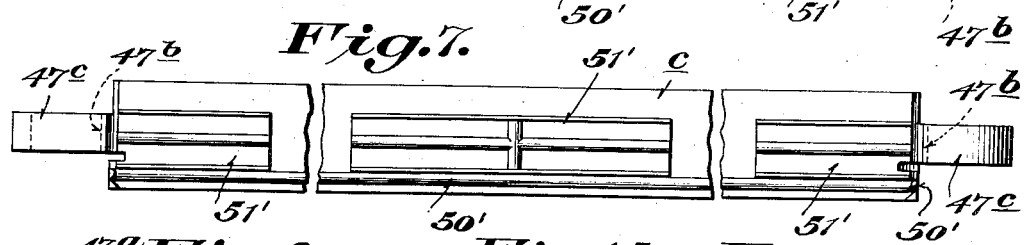
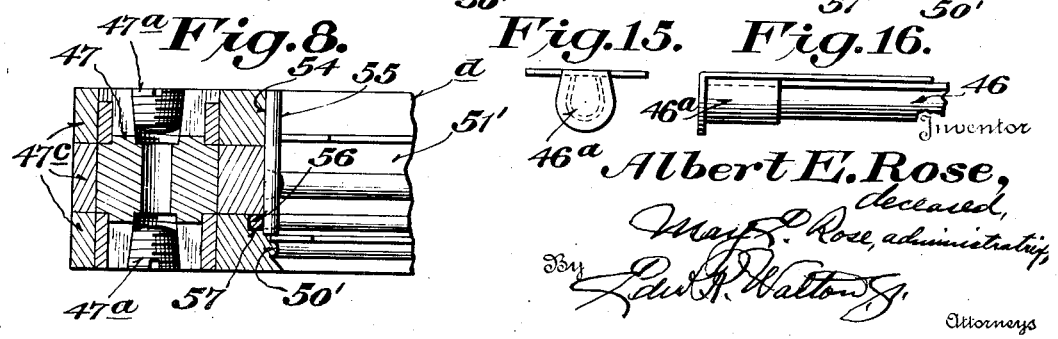
Inventor
Albert E. Rose, deceased,
Mary L. Rose, administratrix,
By Edw. R. Walton Jr.
Attorneys

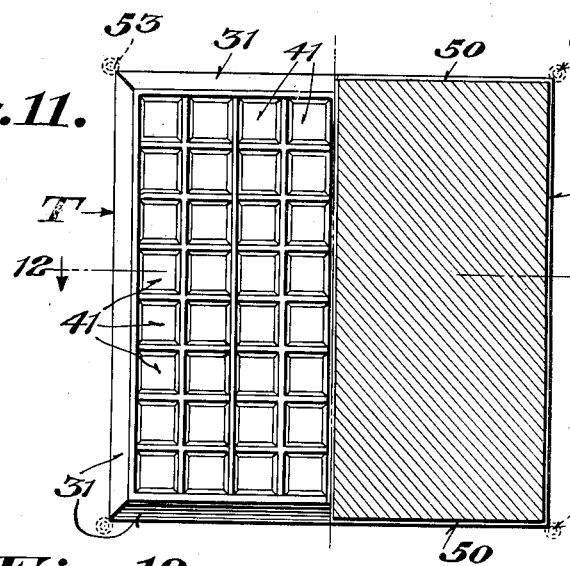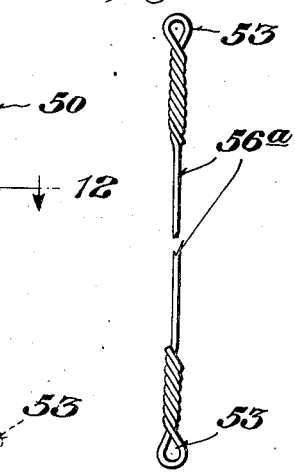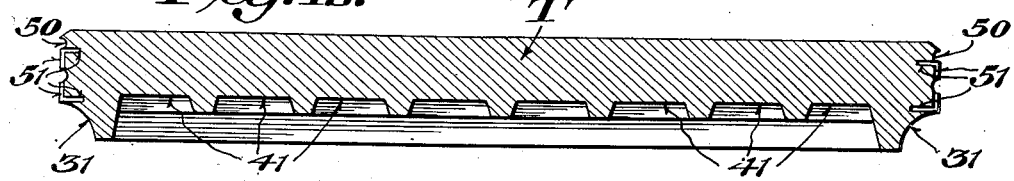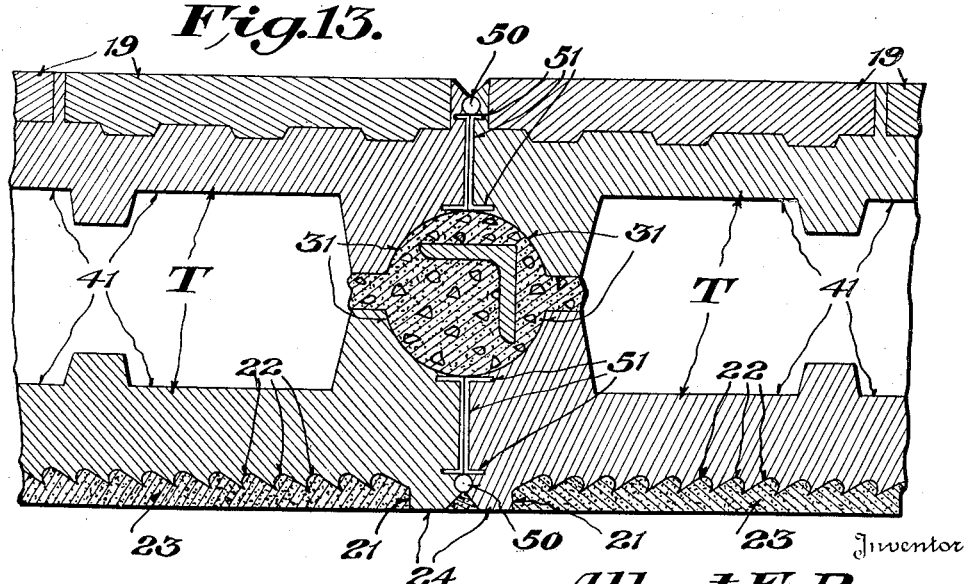

Patented Jan. 30, 1940

2,188,726

UNITED STATES PATENT OFFICE

2,188,726

APPARATUS FOR MOLDING TILE

Albert E. Rose, deceased, late of Lakeland, Fla., by May E. Rose, administratrix, Lakeland, Fla.

Application November 18, 1938, Serial No. 241,260

7 Claims. (Cl. 25—42)

In order that the invention may be more fully understood, it should be first stated that the type or kind of tile, to which the present application appertains, is such as may be disposed edge-to-edge and/or back-to-back to provide an improved finish for ceilings, floors, interior and exterior walls, the edges of the tile having such a finish and construction as will enable them to come into close intimate contact and having means which will allow adjacent edge-to-edge tiles to become interlocked and which will enable tiles placed back-to-back to be fastened to a studding or similar frame construction, thus maintaining the tiles in place. The tile members or elements may be of any geometrical configuration, preferably rectangular and either squares or parallelograms. The face or obverse side of each tile may be finished flat and smooth or may have any ornamentation or configuration formed therein in relief or intaglio, such finish being provided on the face of the tile itself or being provided by insets molded in the face of the tile, or it may be rough and provided with under-cut beads to form keying or clinching surface for plaster and the like. The reverse side of the tile has at the edges thereof, which are intended to be placed vertically, concave or curved rabbets, which in conjunction with similar rabbets in adjacent tile form a recess for receiving the frame work to which the tile is secured. Also the reverse side of the tile may be provided with reinforcing ribs which enable the body of the tile to be made relatively thin, yet giving it the requisite amount of strength.

Due to the fact, as above noted, that the tiles of any one surface may be placed edge-to-edge so as to provide a neat joint without a binding material between them, such as a mortar, it is obvious that they will require careful manufacture and that the edges will require accuracy of dimension and smoothness in the finished product.

An object of the invention, therefore, is the production of tile of the above stated character having accuracy of dimension and requisite smoothness, particularly at the edges thereof, and the provision of a mold allowing the production of the aforesaid tile with obverse and reverse faces as above mentioned and which will enable the mixture in the mold to breathe, during setting, in such manner as will avoid shrinking of the tile from the dimensions defined by the mold itself, thus enabling the finished tile to have side edges with the requisite accurate dimensions.

Further objects of the invention will appear as the specification proceeds and the invention resides in all that is shown and described, being only limited by the scope of the terms of the appended claims.

In the drawings, which show the preferred embodiment of the invention as at present devised, Fig. 1 is a plan view of the mold employed in the manufacture of the tile;

Fig. 2 is an end view of the mold shown in Fig. 1 and looking in the direction of the arrows shown at 2—2 of Fig. 1;

Fig. 3 is a transverse section of the mold taken substantially on line 3—3 of Fig. 1 and showing the materials which compose the tile therein;

Fig. 4 is a transverse section of the mold shown in Fig. 1 and taken substantially on line 4—4 of Fig. 1 at right angles to the section 3—3;

Fig. 5 is a plan view of the side frame of the mold;

Fig. 6 is an elevation of one element of said side frame and looking toward the inner face of said element;

Fig. 7 is a similar view to Fig. 6 but shows another side element of the mold;

Fig. 8 is an enlarged sectional view taken substantially on line 8—8 of Fig. 5;

Fig. 9 is an enlarged fragmentary sectional view taken substantially on line 9—9 of Fig. 5;

Fig. 10 is an enlarged fragmentary view taken substantially on line 10—10 of Fig. 1;

Fig. 11 is a rear elevation of the tile;

Fig. 12 is a transverse sectional view taken substantially on line 12—12 of Fig. 11;

Fig. 13 is a horizontal section taken through a wall of a structure embodying the tile of the present invention, illustrating the character of the tile and the manner in which it is assembled and used;

Fig. 14 is a view of the reinforcing wire for the tile; and

Figs. 15 and 16 show an end view and a side view, respectively, of a spring end protecting cap.

Referring in detail to the drawings in which like characters denote similar and like parts throughout the description, the tile produced is of a cementitious material, whose porosity and density can be governed or controlled by the character of the mixture, and is denoted T in Figures 3, 4, 11, 12, and 13, while the mold for producing said tile is denoted M in Figures 1, 2, 3, and 4.

The mold M comprises a base 15, preferably rectangular, and having metal sides 15a of channel formation, the base being disposed within the channels and resting on the bottom flanges $a$ of said channel sides 1 while the upper flanges $b$ are spaced from and overlie the marginal edge portion of the base 15. An impression plate 17, which forms the bottom of the mold per se, is supported by the base 15, preferably at the level of the flanges $b$, through the medium of a somewhat yieldable and compactable filler 18, such as sand or the like, interposed therebetween.

The impression plate 17 is of hard material and may be of glass, metal (preferably non-rusting or non-corrosive), or like material which will provide a smooth finish to the surface of the tile formed thereby. The tile-forming surface of this plate 17 may be flat or curved and may be provided with any desired design thereon, either in relief or intaglio, which may be impressed or imparted upon the face of the tile T; or, appliques or inserts of any desired character may be placed face down on the plate 17 to be incorporated into the face of the tile T. These inserts may be flooring or wall tile of a different material (kiln-dried, glazed or vitrified) or any other desired material, including metal medallions or plastic designs indicated at 19 in Figure 13. These inserts also may be in the form of pliable flexible mats 20 having a tile forming face so constructed or designed as to mold the face of the tile with a recess 21 having inclined undercut grooves 22 therein, which provide keys for binding or holding plaster 23 and the like thereto, the depth of the recess being that desired by the thickness of the plaster coat 23. The mat 20 is so dimensioned as to cover the area of the face of the tile or to provide a relative narrow stop-bead 24 for the plasterers to work to. After the tile has hardened the mat 20 may be stripped from the tile, because of its flexibility, and reused.

Thus it is obvious that, without making any mechanical changes to the mold M, the tile T may comprise a body of a relatively porous cementitious material having an undercut face 22 for plaster and the like, or having any desired design thereon formed either by impression from the plate 17 or by having appliqued inserts on its outer face. When kiln-dried, glazed or vitrified tile 19 is placed on the plate 17 to be applied or inserted in the tile T, the cementitious mixture, forming the body of the tile T, is poured into the mold M and rapidly solidifies, becoming bonded to the back of said tile or inserts 19 and producing a tile with a hard, washable and weatherproof surface and a relatively porous back or body. This hard surface tile is most useful in bathrooms, floors, public hallways, exteriors of buildings as well as other places, yet the back or body thereof provides the tile T with properties of insulation to heat, cold, and sound and is proof against fire, vermin and decay.

Cooperating with the impression plate 17 and resting thereon to form the side walls of the mold is a frame 25, which is shown as rectangular, but may be of any desired shape for imparting the desired contour to the tile T. This frame 25 is, preferably, hinged at all four corners as it must be completely opened after each tile is molded in order to permit removal of the tile without injury thereto, particularly to the edges thereof.

The members which form the frame 25 have a flat bottom surface or face to form a liquid-tight joint with the impression plate 17 so as to preclude the passage of liquid between it and the impression plate; and the inner side faces of the members of the frame 25 are formed to impart the desired shape or design to the edge portions of the tile. In the drawings the members forming the frame 25 are indicated by the characters $c$, $d$, $e$, and $f$, (Figures 5, 6, and 7) and are shown as comprising rectangular tubing which may be of brass, aluminum or other non-ferrous material, although these members may be of any other suitable material which may be found desirable and useful.

The frame 25 is centered or properly positioned on the base 15 (Figures 3 and 4) by means of guides 26 on two opposite sides of the base. These guides 26 are shown, preferably, as being rollers mounted on vertical axes and carried on the upper side of the flange $b$ of the base binding strip or channel 15a. One of the other sides of the base 15 carries a stop 27, in the form of a right angle bar secured to the flange $b$ of the base rim 15a, and against which the frame 25 may abut when in proper located position, see Figures 1 and 3.

Movably superposed upon the side frame 25 of the mold is a top frame 28 which is of the same shape and design as the frame 25 and, as here shown, comprises the side members $g$, $h$, $i$, and $j$, which may be of any suitable material as, for instance, fiber or a non-ferrous material or any other desired material. These members of the frame 28 are shown as circular in cross-section, but may have any other desired cross-section, and are provided with a rabbet 29 to fit and rest upon the inner upper corner or edge of the side members of the frame 25. By reason of this construction, the members of the frame 28 extend below and into the frame 25 and the portion thereof within the frame 25, at least, has a rounded or arcuate surface 30 which forms the segmental or arcuate rabbet 31 (Figures 11, 12, and 13) in the rear edge of the tile T.

The members of the frame 28 are connected together in any suitable manner to form the frame. However, what it is pleased to call, the side members $g$ and $i$ are of greater length than the members $h$ and $j$. The ends of the members $g$ and $i$ at one end of the frame 28 are provided with projections or hook-like members 32 which extend into eyes or loops 33 carried by the base rim 15a. The other ends of the top frame members $g$ and $i$ provide handles 34 which preferably extend beyond the base 15 and are so positioned as to be engaged by pivoted latch members or hooks 35 pivoted on the base rim 15a in order to hold the top frame 28 down on the impression plate.

In order to place the frame 28 under tension a cross bar 36 may be laid upon and across the same to further clamp the frame in position by means of pivoted hooks 37 on opposite sides of the base rim 15a, the cross bar 36 being disposed mid-way between the end portions of the frame 28.

The top frame 28 is for the purpose of supporting bars or elongated strips 38 which carry by means of screws 39 back plates 40, which latter provide the matrix for forming the grid-like surface 41 on the back of the tile. The strips 38 are arranged in pairs extending lengthwise (from member $h$ to member $j$) of the frame 28, the bars of each pair being spaced from each other but each pair of bars being spaced a greater distance from adjacent pairs of bars, each back plate 40 being secured to its supporting bar 38 at a point adjacent one longitudinal edge of the former. The ends of the bars 38 are supported by any suitable means in a slot 42 extending longitudinally in the end members h and j of the frame 28 so as to have a lateral shifting movement, yet being retained in the frame 28. In this connection the members h and j may be rabbeted out and after the bars 38 are in position a filter strip 42a may be placed in the rabbet; however, it is to be understood that the bars 38 may be mounted on the frame 28 in any suitable manner to provide the movement just described while holding the bars in the frame. The adjacent edges of the bars 38 of each pair of said bars are formed to provide a tapering dovetail slot 43 therebetween and into which is disposed a complemental sliding key 44 having finger pieces 45 thereon. The dovetail slots 43 as well as the keys 44 extend the full length of the bars 38 so as to permit even movement of the bars 38 and the plates 40. Each pair of back plates 40 are connected at their adjacent longitudinal edges by a spring hinge member 46 which tends to exert a biasing tension upon the bars to move them together against the spreading action of their key 44. These spring members 46 may be of a resilient material, bent in loop form and extending the full length of the plates. The edges of the back plates 40 of adjacent bars are preferably spaced apart. In order to prevent the plastic mass T from entering the ends of the spring loops 46 and which, when solidified may prevent the spring from functioning, end caps 46a are provided (see Figs. 4, 15, 16) at the end portions of the springs 46.

The members c, d, e, and f of the side frame 25 of the mold, as above stated, are hinged or pivoted together at their ends, as shown particularly in Figures 5, 8, and 9.

One means for hinging these members together is shown in the drawings and comprise hardened bushings 47, of the split collet type, having tapered center screws 47a for taking up wear or allowing for expansion. These hinges are inserted into aligned cylindrical opening 47b in interengaging hinge lugs or ears 47c on the members of the frame 25 and are provided at all except one corner of the frame 25, where the frame may be opened and spread apart. At this corner of the frame, a locking pin means 48 is provided (see Figures 5 and 9). This locking pin means 48 comprises a tapered pin which is insertable into a corresponding tapered opening formed in the interengaging lugs or ears 48a on adjacent ends of the members e and f of the frame 25. The pin 48 has a projecting portion 48b having a handle piece 48c thereon so that the pin may be turned in said openings and withdrawn with facility. The parts are so formed that when the pin 48 is properly inserted into its tapered opening the entire frame 25 will be in perfect formation. A handle 49 is provided on one member of the frame 25 at the locking pin corner so as to facilitate the opening of the frame when the pin 48 is withdrawn.

The inner faces of the members c, d, e, and f of the side frame 25 are formed to give the tile the proper contour at its edge. To produce the edge groove 50 adjacent the obverse face of the tile, the mold is provided with a suitable bead 50' (see Figures 6, 7, and 8).

Also in the use of the tile, adjacent tiles may be interlocked by an H-shaped clip whose transverse portion or web is channeled for the purpose of allowing fastening wires to extend through these channels in some instances. To provide a recess or housing for the reception of these clips at the edge of the tile so that these clips will not be apparent or in view, the members of the side mold 25 are provided with complementary matrixes 51' which provide the corresponding depressions or recesses 51 in the edge of the tile.

In certain construction work, for instance, in ceiling work it is desirable to have wire loops or eyes 53 at the corner of the tile which may be provided by the anchor 56 in Fig. 5 or by the reinforcing wires 56a in Fig. 14. In order that the looped or eye ends 53 of these members 56 or 56a are exposed in the finished tile and properly positioned during the molding of the tile, the inside corners of the side frame 25 are so drilled as to provide a notch on each adjacent member c, d, e, and f to form an opening 54 at these corners of the frame when the frame is closed, see Fig. 5. In these openings 54 there is removably disposed a pin 55 which extends into a loop or eyelet 53 disposed in a suitable kerf or recess 57, which latter is also provided in the adjacent corner end portions of the members of the frame 25 and, when the frame is opened the pins 55 are released.

In using the above described mold for the manufacture of the tile, the frames 25 and 28 are, of course, removed and the impression plate 17 is brushed clean and placed upon a bed of sand or other semi-resilient material 18. The depth or thickness of the tile may be regulated by the depth of the bed 18 and the depth of the side frames 25 which are employed. After the impression plate 17 of the desired kind or design has been placed upon the bed 18, the frame 25 is placed in position in the manner above described. If it is desired to inset the tile with designs or to face it with a kiln-dried or glazed or vitrified tile, the same is placed upon the top plate of the impression plate 17. If it is desired to face the tile with a recessed keyed surface, a mat 23 is placed upon the upper face of the impression plate 17. The cementitious mixture, which forms the body of the tile T having already been mixed, is poured in liquid form into the mold, the quantity being predetermined. The top frame 28 carrying the back plates 40 is then attached to the base of the mold 15 by inserting the hooks or projections 32 into the eyes 33, and the top frame is then brought rapidly downwards to a position where the hooks 35 will snap over the handles 34 thereof. The tension bar is then put in place and fastened in position by the tension hooks 37.

As the plastic mass begins to set the keys 44 are then moved, by tapping, endwise into the edge slots 43 by means of the handles or knobs 45, thus spreading the plastic mass, at a desired time in its setting process, filling all of the crevices and tightly engaging contiguous parts of the mold and, due to the mixture used, the plastic mass does not contract but expands during setting.

After the mass has "set up" sufficiently so it will not slump, but still plastic, the keys 44 are drawn backwardly to allow the springs 46 to exert their tension on their back plates 40 and move them to their normal or initial position; or the keys 44 may be moved to spread the plates 40 after the mass has "set-up" so that it will retain an impression made into it, yet still plastic, and the keys withdraw backward to allow the action of the springs 46 after the mass has hardened, thus permitting easy withdrawal of the back plates and when the top frame is removed.

The tension bar 36 is removed and the top frame is then released from the hooks 35 and lifted, gently upwardly, disengaging the same from the eye 33.

The side frame 25, together with the tile, is then lifted from the impression plate 17 and placed in a vertical position on one edge of the frame 25; following which the lock pin 48 is then removed and three of the hinged members c, d, e, and f are swung upon their pivots 47 to disengage their respective edges of the tile. The tile is then lifted from the remaining side member of the frame 25 and placed in storage for further curing and hardening.

Having thus described the invention and the manner in which the same is to be performed, it is to be understood that the invention is not to be limited to the exact details of construction herein shown and described as the same may be varied and modified in many respects and the invention is only to be limited to such forms and variations as fall within the scope of the appended claims.

What is claimed is:

1. In a mold for tile and the like comprising a base, the upper surface of which forms the obverse side of the article being molded, side members forming the sides of the mold, a top member for the mold removably supported over said side members; said top member comprising a frame, a plurality of spaced back plates carried by said top frame for forming the reverse side of the object and movable laterally, and means for shifting said plates and maintaining them in their shifted position.

2. In a mold for tile and the like comprising a base, the upper surface of which forms the obverse side of the article being molded, side members forming the sides of the mold, a top member for the mold removably supported over said side members; said top comprising a frame, a plurality of back plates arranged in spaced parallel relation and carried by said frame for forming the reverse side of the object, said back plates being mounted for lateral shifting movement, wedge-shaped keys between said plates for effecting said shifting movement and maintaining the same in shifted position, and biasing means tending to move the plates to their normal position.

3. In a mold as set forth in claim 2 further characterized by said biasing means comprising a strip of spring material disposed between pairs of said backing plates and extending substantially the length of the same, said spring metal strip being formed into a substantial U-shape and having the ends of said U secured to adjacent back plates.

4. In a mold for tile and the like comprising a base, the upper surface of which forms the obverse side of the article being molded, a frame of side members removably positioned on the upper surface of said base and forming the sides of the mold, a top for the mold and spaced from the base and removably supported on said side frame to form the reverse side of the object being molded, and means for maintaining the parts in position, the members of the side frame being hingedly connected together at their adjacent ends to swing in the plane of said frame, the adjacent ends of at least two of the members being readily connectible and disconnectible so that said frame may be opened about said hinge connections.

5. In a mold as set forth in claim 4 further characterized by the corners of the side frame members being recessed on their inner faces to receive the eye portion of an anchoring element for the tile, removable means on the side frame for maintaining said eyes in position.

6. In a mold for tile and the like comprising a base, the upper surface of which forms the obverse side of the article being molded, a frame of side members removably positioned on the upper surface of said base and forming the sides of the mold, a top for the mold and spaced from the base and removably supported on said side frame to form the reverse side of the object being molded, and means for maintaining the parts in position, the corners of the side frame members being hinged and recessed on their inner faces to receive the eye portion of an anchoring element for the tile, opposing faces of certain of the frame members being notched at said corners and which adjacent notches form an opening aligned with said recess at said corner when the members of the side frame are in normal position, a removable pin for each opening to extend into the eye of said reinforcing member for maintaining said anchoring member in position in the frame and which pin will be released from said opening when the members of the frame are swung open from normal closed position.

7. In a mold for tile and the like, a base, a removable impression plate on said base to form the obverse face of the article, a side frame removably disposed on said impression plate for forming the edge surfaces of the article being molded, a top member for the mold adapted to removably rest upon said side frame and to form the reverse side of the article, means for holding said base and frames together in contacting relation, said top frame comprising back plates to engage the mass being molded, said back plates being arranged in substantially spaced parallel relation and mounted to have a transverse shifting movement, each pair of back plates being connected by a spring means to move the same toward each other and having their adjacent edges formed to provide a tapered keyway, and a tapered key in each of said keyways.

MAY E. ROSE,
*Administratrix for the Estate of Albert E. Rose, Deceased.*